March 3, 1970  E. M. KLING  3,499,043
RECOVERY OF THE MONOALKYL ETHERS OF POLY(OXYETHYLENE) GLYCOLS
FROM SOLUTIONS OF TARRY ACETYLENIC POLYMERS IN SAID ETHERS
Filed Jan. 2, 1969

INVENTOR
EUGENE MARVIN KLING

BY

AGENT

United States Patent Office 3,499,043
Patented Mar. 3, 1970

3,499,043
RECOVERY OF THE MONOALKYL ETHERS OF POLY(OXYETHYLENE) GLYCOLS FROM SOLUTIONS OF TARRY ACETYLENIC POLYMERS IN SAID ETHERS
Eugene Marvin Kling, Montague, Mich., assignor to E. I. du Pont de Nemours and Company, Wilmington, Del., a corporation of Delaware
Continuation-in-part of application Ser. No. 641,041, May 24, 1967. This application Jan. 2, 1969, Ser. No. 796,940
Int. Cl. C07c 43/04, 43/10, 11/30
U.S. Cl. 260—615
9 Claims

ABSTRACT OF THE DISCLOSURE

A process for recovering monoalkyl ethers of poly(oxyethylene) glycols in high yields from solutions of tarry acetylenic polymers formed during the preparation of monovinylacetylene in said ethers in which the ether-tar solution is mixed at 11–14° C. with a 2–5% hydrochloric acid solution at proportions of at least 4 volumes of hydrochloric acid per volume of ether-tar solution. The tar precipitates from the ether solution in such a form that it can be readily removed in a subsequent step.

RELATED APPLICATION

This application is a continuation-in-part of copending application Ser. No. 641,041, filed May 24, 1967 and now abandoned.

BACKGROUND OF THE INVENTION

U.S. Patent 2,914,587 to Crancer et al. teaches that important improvements are achieved when the catalyst solution commonly used for polymerizing acetylene to monovinylacetylene (cuprous chloride dissolved in aqueous potassium chloride solution) is modified by adding 1.5 to 20% (based on the weight of the catalyst solution) of a monoalkyl ether of diethylene glycol. Two improvements are increased rates of conversion of the acetylene and increased yields of monovinylacetylene. Other improvements arise from the solvent action of the diethylene glycol monoalkyl ethers from the acetylene tarry residues or by-products which are formed in the polymerization of the acetylene. Without the ether, these residues (hereinafter called tars) accumulate on the walls of the reactor and of tubes and orifices through which the catalyst circulates, and make frequent shut-down for cleaning necessary.

The process disclosed in U.S. Patent 2,914,587 includes removing the solution of the tar in the ether from the reaction mixture, partly precipitating the tar with water and recovering and purifying the ether by distillation and returning it to the catalyst. This series of recovery steps in addition to adding much to the expense, involves considerable loss of the ether by decomposition and, more important, a serious risk in heating the tar, which remains to some extent in the aqueous ether phase and which may contain explosive peroxides. Furthermore, the tar residue which is discarded still contains a considerable amount of ether, resulting in an expensive loss.

Another process for recovering monoalkyl ethers of diethylene glycol from solutions of tarry acetylene polymers formed in the manufacture of monovinylacetylene is disclosed in U.S. Patent 2,857,435 to Gonzales. In this process the solution of the tar in the monoalkyl ether is mixed with dilute hydrochloric acid and a liquid aromatic hydrocarbon solvent followed by separating the mixture into a lighter liquid layer comprising tar and solvent and a heavier liquid layer comprising the monoalkyl ether and the dilute hydrochloric acid. The acid solution of the monoalkyl ether of diethylene glycol is then reused in the manufacture of monovinylacetylene.

While the process of U.S. 2,857,435 overcomes some of the disadvantages of the process of U.S. 2,914,587, other problems are created by the liquid extractions. For example: (1) the viscosities of the solutions are not always low enough for good handling, and (2) there still remains an undesirable loss of the ether in the solvent/tar stream which is discarded. Thus, there remains a need for a simple and more efficient process for recovering the ether from the catalyst tar.

SUMMARY OF THE INVENTION

According to this invention a process is provided for separating poly(oxyethylene) glycol monoalkyl ethers from solutions of said ethers and tarry acetylene polymers formed during the manufacture of monovinylacetylene in which the ether-tar solution is mixed with a hydrochloric acid solution containing about 2–5% by weight hydrogen chloride to precipitate tar. The temperature of the ether-tar/hydrochloric acid mixture is maintained at 11–14° C. during the precipitation. The solutions are mixed in proportions such that the volume ratio of aqueous hydrochloric acid solution to the ether-tar solution is at least 4 to 1. The precipitated tar is separated from the mixture by mechanical means such as centrifugation.

DESCRIPTION OF THE DRAWING

The invention is illustrated in FIGURE 1 attached hereto. The main features of the conventional process for manufacturing monovinylacetylene are illustrated in FIGURE 2 to show the origin and disposition of the streams D and G involved in the process of this invention.

Figure 1:
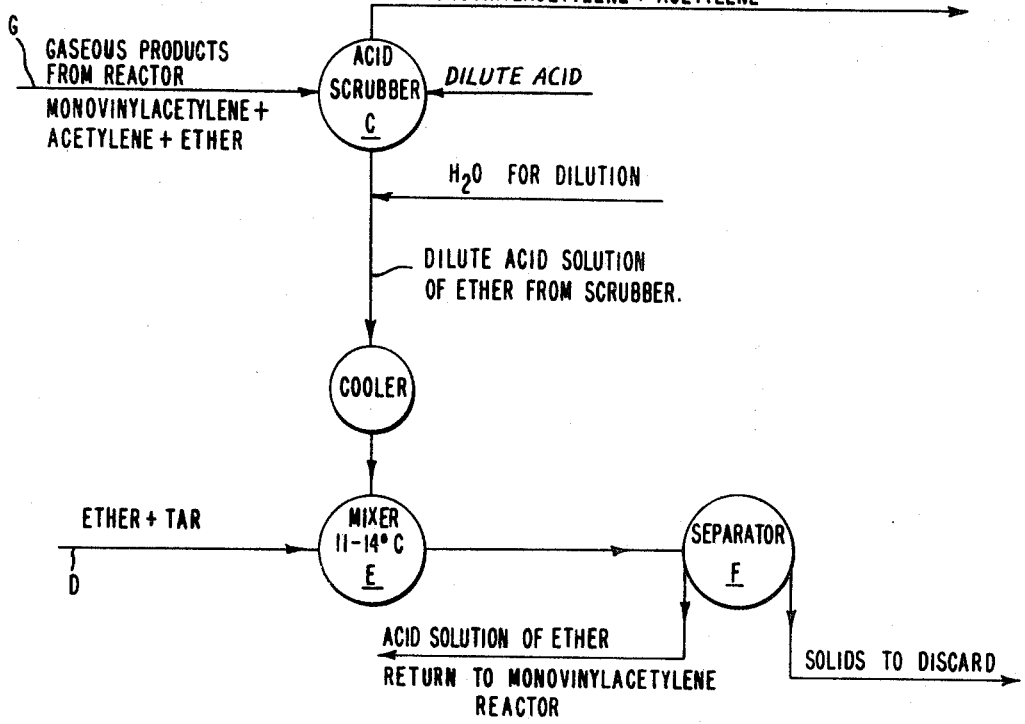

From the top of reactor A the gaseous products of the reaction are passed in stream G to acid scrubber C, into which dilute hydrochloric acid is introduced, (FIGURE 1) where the ether content is largely condensed. The upper layer in settler B of FIGURE 2 is a solution of tar in the monoalkyl ether of poly(oxyethylene) glycol which is drawn off through the outlet D. This stream is the ether-tar solution which is treated by the process of this invention. Stream D is fed into mixer E (FIGURE 1) simultaneously with the diluted and cooled outlet stream from scrubber C. The scrubber stream is diluted with water to reduce the hydrochloric acid content to 2–5% by weight and is then cooled to about 12° C. The tar is precipitated upon contact with the cool acid stream and the slurried particles of tar from mixer E in the aqueous acid solution of ether are passed to separator F which separates the solids for discard from the liquid stream which is returned to the main monovinylacetylene reactor process.

DETAILED DESCRIPTION

It should be understood that the tarry acetylenic polymers are not completely dissolved in the poly(oxyethylene) glycol monoalkyl ethers; however, since the tars are substantially in solution and the prior art refers to these mixtures as "ether-tar solutions," the same terminology is used herein. The ether-tar solution will ordinarily contain from about 4–8% by weight of tar for optimum performance of the reactor, although solutions containing more or less tar can be effectively treated by the process of this invention. The drawing attached hereto shows the ether-tar solution as that which comes directly from the reactor A and is passed through the settler B; however, the process is applicable to any solution of tarry acetylenic polymers formed in the preparation of monovinylacetylene in a poly(oxyethylene) glycol monoalkyl ether.

The hydrochloric acid solution to be used in precipitating the tar from the ether is cooled prior to mixing to a sufficiently low temperature that the hydrochloric acid/ether-tar mixture formed attains a temperature of about 11–14° C. Since the acid solution supplies the largest proportion of the volume of the mixture by a margin of at least 4 to 1 and the ether-tar stream is seldom at a temperature above 60° C., the temperature of the acid prior to mixing rarely need to below about 10° C. The two streams can be mixed in any manner; however, it is preferred that the ether-tar solution be injected directly into the acid stream in the mixer and that the two streams be fed together at speeds sufficient to cause substantial turbulence. The mixing step need only be continued for a sufficient time to allow the mixture to attain the temperatures indicated above.

In cooling and mixing the solutions to cause precipitation of the tar the temperature range of about 11–14° C. is important. Below about 11° C. the ether-tar/hydrochloric acid mixture freezes, and above about 14° C. the precipitated particles of tar solids become extremely adhesive and difficult to handle in the separation step.

In forming the tar-precipitate with dilute acid, it is necessary that the hydrochloric acid solution have a concentration of about 2–5% by weight. This acid solution can be provided from any source, however, for economic reasons and convenience, it is preferred that the dilute hydrochloric acid used for scrubbing the exit gas stream from the monovinylacetylene reactor be used.

It is necessary that the volume ratio of the acid to the ether-tar solution used be at least about 4:1. If the volume ratio is less than 4:1, recovery of the monoalkyl ether from the tar solution is incomplete. The ratio of aqueous acid to the ether-tar solution can exceed 15:1 without adversely affecting the precipitation, but it is uneconomical to do so since large amounts of the diluted ether must then be processed. Precipitation is best effected at acid/ether-tar ratios of 10–15:1; however, even at these proportions the large amounts of acid solution can be difficult to handle and dispose of. In the overall monovinylacetylene process it is therefore preferred to employ volume ratios of about 4:1 to 6:1. At these levels, up to 99% of the ether can be separated from the tar and yet there is no difficulty in handling the acid solution.

Mixing of the two solutions can be accomplished in any suitable air-tight vessel. A preferred method is to pass the hydrochloric acid through a vertical pipe and inject the ether-tar solution into the pipe and acid, the velocities of the two streams being sufficient to effect adequate mixing. After the mixing step, a slurry is formed comprising the precipitated tar particles in the ether-hydrochloric acid mixture, which tar particles are readily removed with a minimal loss of ether. After mixing, the slurry is continuously transferred to a separator. The separation can be effected by use of conventional means such as a centrifuge, settling tank or continuous filtration. As stated above, the temperature during the precipitation step is about 11–14° C. While the slurry of tar particles in the ether-tar/hydrochloric acid mixture is being transferred to the separator, it is maintained at a temperature in the range of just above the freezing point of the ether-tar/hydrochloric acid mixture to about 14° C. to keep the precipitated tar in a form conducive to effective removal. During separation, the temperature of the slurry is maintained at from about 11–14° C. A particularly preferred method of removal is centrifugation with the centrifuge operating at a speed of about 6000 r.p.m. The tar solids which accumulate are discharged and discarded, while the acid solution of the monoalkyl ether is recovered and recycled to the monovinylacetylene process.

The poly(oxyethylene) glycol monoalkyl ethers which can be separated from tars by the process of this invention correspond to the formula:

$$HO(CH_2-CH_2-O)_nR$$

wherein R is an alkyl group containing from about 1–8 carbon atoms such as propyl, butyl and pentyl and $n$ is 2, 3 or 4. Di(oxyethylene) glycol mono-n-butyl ether (also known as diethylene glycol mono-n-butyl ether) has been used in the past in the preparation of monovinylacetylene; however, the corresponding tri(oxyethylene) glycol derivative can also be used and is preferred because of its lower volatility.

The process of this invention has the advantages of being simple and efficient, particularly when the acid stream from the scrubber is used to precipitate the tars from solution. It has the particular advantage of effecting a substantially complete separation of the tars from the ether solution, thus achieving a significant savings in a high rate of etther recovery. For example, it is possible to recover about 97–99% of the monoalkyl ether from the ether-tar solution by employing this process.

EXAMPLE 1

Figure 2:
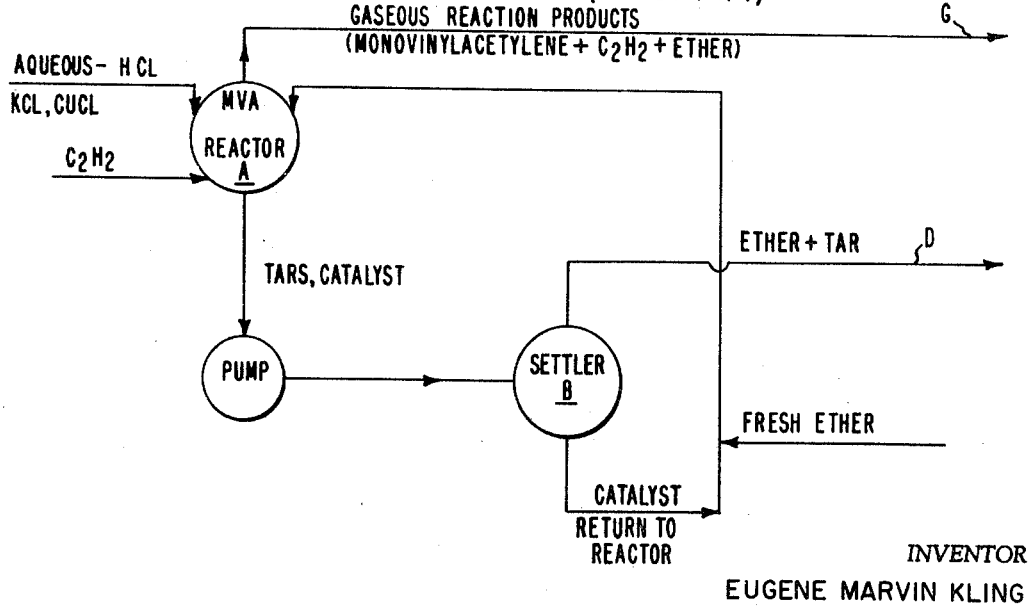
In FIGURE 2, reactor A contains aqueous cuprous chloride catalyst for polymerizing acetylene to monovinylacetylene. An outlet is provided at the bottom of the reactor connected through a pump to a settler B from which the liquid may be drawn off at both the top and bottom. The liquid from the bottom of settler B is returned to the top of the reactor A. The monoalkyl ether of poly(oxyethylene) glycol is introduced in this line.

This example is carried out using the apparatus described in FIGURES 1 and 2. Acetylene is converted to monovinylacetylene in a reactor A containing an equeous cuprous chloride catalyst and diethylene glycol monobutyl ether according to the process disclosed in U.S. Patent 2,914,587. Tar forms in the reactor and dissolves in the ether as disclosed in the patent. Part of the catalyst solution is pumped to separator B and the ether solution of the tar separates in the top part of the separator. The untarred catalyst solution is returned to the reactor.

The ether solution of tar contains about 7% tar solids by weight and about 60% diethylene glycol monobutyl ether by weight; the remaining portion comprises catalyst residues and various by-products and additives, such as cuprous chloride, divinylacetylene, chloroprene, acetone and acetaldehyde. It is drawn off from the top of the separator and mixed rapidly in mixer E with 5 volumes of a dilute acid solution of diethylene glycol monobutyl ether prepared by diluting the effluent from acid scrubber C with water. The effluent from the acid scrubber contains 5–6% hydrochloric acid by weight and it is diluted with water to reduce the hydrochloric acid content to about 2.5% by weight. The diluted acidic solution then contains about 90% water and about 5% by weight of diethylene glycol monobutyl ether. The remaining portion of the acid stream comprises small amounts of reaction by-products and additives which aid in other stages of the monovinylacetylene process. The dilute acidic solution is cooled to 11° C. in a cooler, before mixing it with the ether solution of tar in mixer E. The mixer and contents are maintained at a temperature of 11–14° C. A precipitate starts to form quickly, but sufficient mixing is maintained to prevent settling out of the solids. The slurry is passed at a rate of about 1 gallon per minute to separator F which is a centrifuge. The centrifuge is maintained at 12° C. and operates under a force of about 3200×gravity. The solids separate from the liquid and are discarded continuously. They contain less than 3% by weight of the ether. The liquid phase containing the acid solution of diethylene glycol monobutyl ether is continuously recovered from the centrifuge and returned to the process.

EXAMPLE 2

The procedure of Example 1 is followed except the ether solution of tar from the monovinylacetylene process (Feed D in the figures) contains (by weight) about 7% tar, 38% tri(oxyethylene) glycol monobutyl ether and 10% diethylene glycol monobutyl ether and the acid solution from the scrubber contains about 2–3% hydrochloric acid, 3% triethylene glycol monobutyl ether, 1% diethylene glycol monobutyl ether and 90% water. Four volumes of hydrochloric acid solution per volume of ether-tar solution is used. Both streams are at 11° C. prior to mixing and the mixer and contents are maintained at 11–14° C. during the precipitation step. The tar is precipitated by addition of the hydrochloric acid solution, and the resulting slurry is filtered using a 100 mesh stainless steel screen to collect the precipitated tar. Approximately 2% of the glycol ethers remain in the tar, the other 98% being recovered in the acid solution. The acid solution is reusable in the monovinyl acetylene process without further treatment.

What is claimed is:

1. A process for purifying a solution of tarry acetylenic polymers formed during the preparation of monovinylacetylene by dimerizing acetylene in the presence of an aqueous cuprous chloride-potassum chloride catalyst and an organic phase comprising a monoalkyl ether of poly-(oxyethylene) glycol, wherein said alkyl group contains from about 1–8 carbon atoms, and removing the gaseous reaction products, an ether-tar solution and an aqueous phase which consists essentially of precipitating tar by mixing a hydrochloric acid solution containing about 2–5% by weight hydrogen chloride with said ether-tar solution in such proportions that the volume ratio of hydrochloric acid to ether-tar solution is at least about 4 to 1, said hydrochloric acid solution being maintained at such a temperature that the temperature of the hydrochloric acid/ether-tar mixture is from about 11–14° C., and thereafter mechanically removing the precipitated tar from the hydrochloric acid/ether-tar mixture at said temperatures.

2. A process of claim 1 wherein the ether-tar solution contains from about 4–8% by weight tar.

3. A process of claim 1 wherein the precipitated tar is removed from the ether-tar/hydrochloric acid mixture by centrifuging.

4. A process of claim 1 wherein the ether is diethylene glycol n-butyl ether.

5. A process of claim 1 wherein the hydrochloric acid to ether-tar solution volume ratio is about 4:1–15:1.

6. A process of claim 1 wherein the hydrochloric acid to ether-tar solution volume ratio is about 4:1–6:1.

7. A process of claim 1 wherein the hydrochloric acid to ether-tar solution volume ratio is from about 10:1–15:1.

8. A process of claim 1 wherein at least part of the ether is tri(oxyethylene) glycol n-butyl ether.

9. A process of claim 8 wherein the hydrochloric acid to ether-tar solution volume ratio is about 4:1–6:1 and the precipitated tar is removed by centrifuging.

References Cited

UNITED STATES PATENTS 2,857,435 10/1958 Gonzalez _____ 260—616
2,914,587 10/1959 Crancer et al. _____ 260—616 XR LEON ZITVER, Primary Examiner H. T. MARS, Assistant Examiner U.S. Cl. X.R.

260—678